United States Patent
House et al.

(10) Patent No.: US 6,642,344 B1
(45) Date of Patent: Nov. 4, 2003

(54) CURING AGENTS FOR EPOXY-BASED POLYMERS

(75) Inventors: David W. House, Arlington Heights, IL (US); Ray V. Scott, Jr., Schaumburg, IL (US)

(73) Assignee: Dorf Ketal Chemicals, LLC, Stafford, TX (US)

( * ) Notice: Subject to any disclaimer, the term of this patent is extended or adjusted under 35 U.S.C. 154(b) by 0 days.

(21) Appl. No.: 10/054,268

(22) Filed: Jan. 22, 2002

Related U.S. Application Data

(60) Provisional application No. 60/268,129, filed on Feb. 12, 2001.

(51) Int. Cl.[7] ............................................. C08G 59/68
(52) U.S. Cl. ..................... 528/91; 525/523; 528/110; 528/111; 528/405; 528/408; 528/418; 528/421
(58) Field of Search ............................. 528/89, 90, 91, 528/110, 111, 405, 408, 418, 421

(56) References Cited

U.S. PATENT DOCUMENTS

| | | | |
|---|---|---|---|
| 3,280,043 A | 10/1966 | Larson et al. | 260/2 |
| 3,634,275 A | 1/1972 | Sundholm | 252/182 |
| 3,752,768 A | 8/1973 | Thompson et al. | 252/182 |
| 4,079,003 A | 3/1978 | Manchak | 210/46 |
| 5,312,886 A | 5/1994 | House et al. | 528/64 |
| 5,508,326 A | * | 4/1996 Muto | 523/415 |

FOREIGN PATENT DOCUMENTS

JP  61-40318  5/1994
JP  63-37117  12/1994

OTHER PUBLICATIONS

Lee, H.; Neville, K. *Handbook of Epoxy Resins;* McGraw–Hill: New York, 1982, 16–2, 16–3 and 9–7.

* cited by examiner

*Primary Examiner*—Robert Dawson
*Assistant Examiner*—D. Aylward

(57) ABSTRACT

A method for making flexible epoxy resins by curing an epoxide and a bis-phenol with an aliphatic secondary diamine having the structural formula (I) or (II):

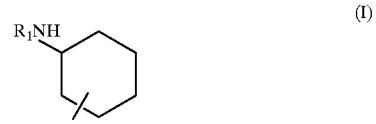

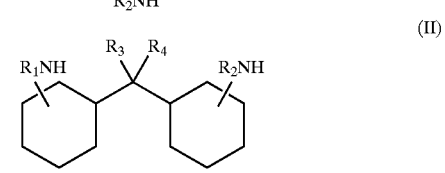

where $R_1$ and $R_2$ are each individually an alkyl, alkenyl, aryl, or arylalkyl group having from about 1 to about 20 carbon atoms, and $R_3$ and $R_4$ are each individually an alkyl or alkenyl group having from about 1 to about 20 carbon atoms, or hydrogen.

18 Claims, No Drawings

CURING AGENTS FOR EPOXY-BASED POLYMERS

CROSS-REFERENCE TO RELATED APPLICATION

This application claims priority from Provisional Application Ser. No. 60/268,129 filed Feb. 12, 2001, now abandoned the contents of which are hereby incorporated by reference in its entirety.

FIELD OF THE INVENTION

The invention relates to the curing of epoxy resins and more particularly to a new class of aliphatic secondary diamine curing agents for flexible epoxy resins which are less brittle but yet maintain high hardness and excellent chemical and wear resistance.

BACKGROUND OF THE INVENTION

Although epoxy resins have been found to be very useful in numerous applications relying on great strength, such as bonding agents, laminates and tooling, the cured unflexibilized epoxy resins are also quite brittle and tend to chip or fracture in applications requiring flexibility or impact. The present invention relates to cured epoxy resins used for protective surface coatings, such as paints, insulation, etc., where chipping and fracturing of the coating during flexure must be avoided. The cured epoxy resins of the present invention have decreased brittleness and improved impact resistance while maintaining the high hardness and the excellent chemical and wear resistance needed in, for example, coating applications.

Epoxy resins are formed by the reaction of a 1,2-epoxy compound and a polyol, including dihydric phenols or glycols. A commonly available epoxy resin, preferred for many applications, is prepared from epichlorohydrin and Bis-Phenol A (2,2-bis-(4-hydroxyphenol) propane). Other useful 1,2-epoxy compounds include 1,2-epoxy-4-chlorobutane, 1,2-epoxy-5-chloropentane, 1,2-epoxy-6-chlorohexane, dichlorohydrin, butadiene dioxide, polyglycidyl ethers of ethylene glycol, propylene glycol, trimethylene glycol, diethylene glycol, triethylene glycol, dipropylene glycol, glycerol, etc. Other dihydric phenols may be employed, including resorcinol, catechol, hydroquinone, 4,4'-dihydroxybenzophenone, 1,1-bis-(4-hydroxyphenyl)-ethane, 1,1-bis-(4-hydroxyphenyl)-butane, 2,2-bis-(4-hydroxyphenyl)-butane, (Bis-Phenol-B), 1,5-dihydroxynaphthylene, etc. Other polyols which may be reacted with a 1,2-epoxy compound include ethylene glycol, propylene glycol, trimethylene glycol, diethylene glycol, triethylene glycol, glycerol, erythritol, pentaerythritol, mannitol, sorbitol, polyallyl alcohol, polyvinyl alcohol, etc. Epoxy resins formed from combinations of the 1,2-epoxy compounds and polyols referred to above are not necessarily equivalent and furthermore, the composition of the epoxy resin is dependent upon the molecular proportions of the 1,2-epoxy compound and the polyol, as is well understood in the art.

In order to form the desired final product, the epoxy resin must be cured, during which a curing agent reacts with the epoxy resin to form a thermoset resin. The epoxy resin may be a viscous liquid, a semi-solid or solid, soluble in certain organic solvents or liquefiable on mild heating. The reaction may be catalyzed by an organic acid, an organic base such as tertiary amines, or a Lewis acid such as boron trifluoride and boron trifluoride ether complexes.

Various amine compounds have been suggested for use as curing agents for epoxy resins. For example, U.S. Pat. No. 3,280,043 B1 discloses that $N^1,N^3$-dialkyldiethylenetriamine is a curing agent for epoxy resins which will impart flexibility to the cured epoxy resin. Other curing agents having flexibilizing capability have been discussed in Lee, H.; Neville, K. *Handbook of Epoxy Resins*; McGraw-Hill: New York, 1982, 16-2 and 16-3, e.g., polyether diamines, fatty polyamides, amidopolyamines, polymeric acids, carboxyl-terminated polyesters, anhydrides and reactive modifiers, e.g., furfural-ketone reaction products. The secondary triamines of U.S. Pat. No. 3,280,043 B1 are mentioned in the Handbook of Epoxy Resins at page 9-7. Partially N-alkylated diphenylmethane bases are disclosed as epoxy curing agents in U.S. Pat. No. 3,634,275 B1. Japanese Kokai Patent Nos. 61-40318 and 63-37,117 disclose aromatic secondary diamines as curing agents for epoxy resins. The present invention avoids the drawbacks of the polyfunctional flexibilizers discussed above.

U.S. Pat. No. 4,709,003 B1 discloses alkylated triamines as curing agents for manufacturing polyurethanes. U.S. Pat. No. 3,752,768 B1 discloses a reaction mixture for producing a curing agent for epoxy resins, polyurethane foams and elastomers comprising a complex mixture of aniline and aniline derivatives and formaldehyde. U.S. Pat. No. 5,312,886 B1 discloses bis(N-alkylaminocyclohexyl)methanes as chain extenders in the formation of polyurethane and polyurea polymers.

SUMMARY OF THE INVENTION

The invention is an epoxy resin cured with an aliphatic secondary diamine curing agent having the structure of:

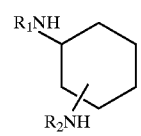

(I)

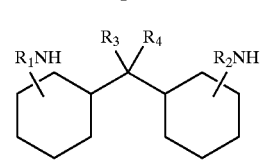

(II)

where $R_1$ and $R_2$ are each individually an alkyl, alkenyl, aryl, or arylalkyl group having from about 1 to about 20 carbon atoms, and $R_3$ and $R_4$ are each individually a hydrogen, an alkyl group having from 1–20 carbon atoms, or an alkenyl group having from 1–20 carbon atoms. Another embodiment of the invention is a method of curing an epoxy resin using at least one curing agent (I) or (II) above.

DESCRIPTION OF THE INVENTION

The flexible epoxy resins of the present invention are cured with a curing agent comprising at least one aliphatic secondary diamine curing agent having the structure of:

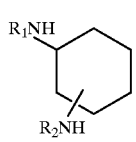

(I)

-continued

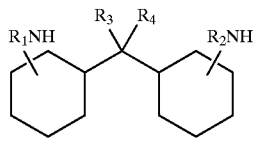

(II)

where $R_1$ and $R_2$ are each individually an alkyl, alkenyl, aryl, or arylalkyl group having from about 1 to about 20 carbon atoms, and $R_3$ and $R_4$ are each individually hydrogen, an alkyl group having from 1–20 carbon atoms, or an alkenyl group having from 1–20 carbon atoms. The flexibility of the cured resin would be enhanced when the curing agent of the present invention was used as compared to cured epoxy resins made with other similar curing agents.

The epoxy resins useful in the invention include the bis-phenol A-based epoxy resins as well as other polyol-based resins including novolac resins, etc., in which the phenol is reacted with a 1,2-epoxy compound, preferably epichlorohydrin. The resin may be a low or high viscosity liquid, a solid or a solution of a solid in an organic solvent. Suitable solvents include ketones, especially acetone, methyl ethyl ketone and methyl isobutyl ketone. Before curing the epoxy resin, additional materials may be added to fulfill certain functions, such as fillers, pigments and, even, additional flexibilizers or plasticizers.

As stated above, the curing agent of the present invention is an aliphatic secondary diamine having one of the following two general structures:

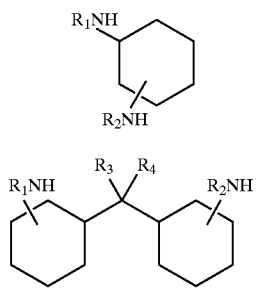

where $R_1$ and $R_2$ may be an alkyl, alkenyl, aryl, or arylalkyl, group and having from about 1 to about 20 carbon atoms. Although $R_1$ and $R_2$ need not be the same, in most cases they will be identical simply because of the convenience of their preparation. The alkyl groups may be linear, branched or cyclic. Representative alkyl groups include methyl, ethyl, propyl, isopropyl, butyl, isobutyl, secondary butyl, tertiary butyl, and the various isomeric pentyl, hexyl, heptyl, octyl, nonyl, and decyl groups. The preferred $R_1$ and $R_2$ contain at least three carbon atoms with the sec-butyl group being particularly preferred. Representative aryl groups include phenyl and benzyl with representative arylalkyl groups including substituted phenyl and substituted benzyl. Examples of alkenyl groups are the unsaturated counterparts of the aforementioned alkyl groups. Secondary alkyl or alkenyl groups, i.e., those branched at the carbon atom bound to the nitrogen atom, and secondary alkyl groups in particular are preferred. Representative of such groups are 2-propyl, 2-butyl, 2-pentyl, 3-pentyl, 2-hexyl, and so forth. The groups $R_3$ and $R_4$ are each individually either an alkyl or an alkenyl group having from 1–20 carbon atoms, preferably from 1–8 carbon atoms or hydrogen. The alkyl or alkenyl group may be linear, cyclic or branched. Examples of alkyl groups include methyl, ethyl, propyl, butyl, pentyl, hexyl, cyclohexyl, heptyl, octyl, nonyl, decyl, undecyl, dodecyl, tridecyl, tetradecyl, pentadecyl, hexadecyl, heptadecyl, octadecyl, nonadecyl, and eicosyl moieties. Examples of alkenyl groups are the unsaturated counterparts of the alkyl groups above. Secondary alkyl or alkenyl groups, i.e., those branched at the carbon atom bound to the nitrogen atom, and secondary alkyl groups in particular, are preferred in the practice of this invention. Representative of such groups are 2-propyl, 2-butyl, 2-pentyl, 3-pentyl, 2-hexyl, and so forth. A preferred curing agent is bis-(4-sec-butylaminocyclohexyl)-methane.

In another embodiment of the invention, the curing agent is used as a mixture with other curing agents. In this embodiment, it is preferred that the curing agent of the present invention is used in a concentration of at least 10 percent by equivalent of the total curing agents and more particularly, in a concentration of from about 25% to about 80% by equivalent of the total curing agents. The other curing agents may be those commonly used in the industry to cure epoxy resins such as polyfunctional amines. The preferred known curing agents that may be used in combination with the curing agents of the present invention are primary polyamines. A suitable primary diamine curing agent is 1,2-diaminocyclohexane.

There are several advantages of using a mixture of the curing agents of the present invention and other curing agents. For example, a preferred mixture is bis-(4-sec-butylaminocyclohexyl)-methane and 1,2-diaminocyclohexane which results in a cured epoxy resin having greater crosslinking and a more suitable glass transition temperature than an epoxy resin cured by bis-(4-sec-butylamino-cyclohexyl)-methane alone. Another advantage is that the cure time of a formulation may be decreased by increasing the level of the 1,2-diaminocyclohexane. Also, since bis-(4-sec-butylaminocyclohexyl)-methane is higher in equivalent weight than 1,2-diaminocyclohexane, one can vary the ratio of the two curatives in order to obtain a 1:1 ratio by volume of the A-side (the epoxy resin) and B-side (the curatives) of the epoxy resin formulation. The 1:1 ratio is preferred since it tends to produce better, more homogeneous polymers than other ratios. Also, one can meter out the two sides using typical metering equipment. Furthermore, the 1:1 balancing may be completed without having to add solvents or fillers.

Curing of the epoxy resin is effected in any suitable manner. The temperature and time of heating and concentration of the curing agent will depend upon the specific epoxy resin employed. The properties of the epoxy resin itself depend upon the number of epoxy groups in the resin and the method of manufacture. In a preferred embodiment, the curing agent is used in concentrations of about 70 to 110% of the epoxy equivalent weight, preferably about 95% of the epoxy equivalent weight to the epoxy resin. The working time of a formulation may be easily increased by increasing the amount of the curing agent of the invention.

The specific curing procedure will depend upon the particular application of the epoxy resin. In one embodiment, the curing agent is commingled with the epoxy resin and the mixture is heated and then placed in suitable molds and allowed to set into the desired pattern and/or the mixture is heated in the molds. In another embodiment, the curing agent is mixed with the epoxy resin and the mixture is used as a bonding agent in laminates which may be heated and pressed at the same time, or the heating may precede the pressing. In yet another embodiment, the epoxy resin, the curing agent(s) and any other components are mixed and then painted onto the surface or spread out onto a surface and then heated or allowed to cure. It is understood that any suitable method of effecting the curing may be employed and the specific procedure will depend upon the particular application of the epoxy resin.

When a mixture of the curing agent of the present invention and a known curing agent is used, the process of curing may be conducted in stages. For example, when the curing agent of the present invention is used as a mixture with a primary polyamine, in the first stage of curing the primary polyamine would react with the epoxy resin at a suitable temperature. Then, in the second stage of curing, the temperature would be raised to a level where the aliphatic secondary diamine of the present invention would react with the epoxy resin, thereby leading to a fully cured polymer.

When desired, a suitable solvent, filler, thixotropic agent, diluent, etc., may be incorporated in the epoxy resin and/or the curing agent prior to curing. When the resin is supplied as a solid, it may be dissolved in a suitable solvent, and the curing agent intimately admixed therein. Any suitable solvent may be employed. Illustrative solvents include ketones such as acetone, methyl ethyl ketone, methyl isobutyl ketone, isophorone, diacetone alcohol, etc., ether alcohols as methyl, ethyl or butyl ether or ethylene glycol or diethylene glycol, Cellosolve, etc., chlorinated solvents such as trichloropropane, trichlorobutane, chloroform, etc. The filler to be employed will depend upon the purpose for which the epoxy resin is to be used. Illustrative fillers include powdered metals and metal oxides such as powdered iron oxide, aluminum oxide, etc., copper, aluminum, etc., silica, inorganic silicates, sand, glass, asbestos, carbon, calcium carbonate, etc. In order to prevent the filler from settling during curing, an organophilic thixotroping agent may be employed and this may be selected from any of the suitable commercially available materials. Diluents such as hydrocarbons including, for example, benzene, toluene, xylene, ethylbenzene, cumene, etc., may be employed, particularly with liquid resins. This serves to reduce the viscosity and to increase the useful pot life without seriously affecting the final properties of the resin.

When desired, the epoxy resin, either with or without a solvent, may be heated mildly prior to admixing the curing agent therewith. The mild heating generally will be within the range of from about room temperature to 60° C. or more. It is important that the curing agent be intimately mixed with the resin, and this may be accomplished by hand mixing using a paddle, particularly in batch preparations, by the use of a mechanically rotating blade in continuous or batch preparations, or in any suitable manner.

The temperature of curing will range from ambient to an elevated temperature of 300° C. or more. Usually the temperature will be within the range of from about room temperature to about 150° C. The time of heating also will depend upon the particular epoxy resin and curing agent employed, as well as the use to be made of the resin. The time generally will be from about 10 minutes to 20 hours or more, depending upon whether it is a fast or slow cure. In general, shorter times result with higher temperatures and likewise, longer times with lower temperatures. While the curing may be effected at atmospheric pressure, superatmospheric pressure may be utilized in the curing and may range up to 5000 pounds or more per square inch. The curing is an exothermic reaction and, when desired, means for controlling the heat of reaction may be employed.

In applications where the curing agent of the present invention is used as a mixture with another known curing agent such as a primary polyamine, the curing temperature of the first stage will range from ambient to an elevated temperature of 300° C. or more. Usually the temperature will be within the range of from about ambient to about 150° C. The time of the first stage heating also will depend upon the particular epoxy resin and curing agent employed, as well as the use to be made of the resin. The time generally will be from about 10 minutes to 20 hours or more, depending upon whether it is a fast or slow cure. A maximum temperature and time for the first stage are selected so that the curing agent of the present invention shows little or no reactivity but the other known curing agent does react. Then, in the second stage of curing, the temperature would be raised to a level sufficient to cause the curing agent of the present invention to react. Again, the actual temperature and the time of the second stage heating also will depend upon the particular epoxy resin and curing agent employed, as well as the use to be made of the resin. The time generally will be from about 10 minutes to 20 hours or more, depending upon whether it is a fast or slow cure.

EXAMPLE 1

Into a 5-ounce, waxed paper cup were weighed 18.84 grams of the epoxy resin EPON 828, available from Shell Chemical Company, 4.03 grams of bis-(4-sec-butylaminocyclohexyl)-methane, and 2.14 grams of DCH-99 (1,2-diaminocyclohexane) available from DuPont Chemicals. The ratio of DCH-99 to bis-(4-sec-butylaminocyclohexyl)-methane was 75/25, based on equivalents, and the stoichiometry of the epoxy resin to the curatives was 100%. The components were thoroughly mixed for 4 minutes at room temperature using a metal spatula, then poured into a small aluminum weighing pan. The pan was placed in a convection oven at 100° C. for one hour. The slightly turbid mixture quickly became clear upon heating. Within 30 minutes, a clear, hard, and tack free plaque was formed.

EXAMPLE 2

Into a 5-ounce, waxed paper cup were weighed 21.72 grams of the epoxy resin EPON 828 and 3.28 grams of DCH-99. The stoichiometry of the epoxy resin to the curative was 100%. The components were thoroughly mixed for 4 minutes at room temperature using a metal spatula, then poured into a small aluminum weighing pan. The pan was placed in a convection oven at 100° C. for one hour. Within 30 minutes, a clear, very hard, and tack free plaque was formed.

EXAMPLE 3

Into a 5-ounce, waxed paper cup were weighed 16.63 grams of the epoxy resin EPON 828, 7.11 grams of bis-(4-sec-butylaminocyclohexyl)-methane, and 1.26 grams of DCH-99. The ratio of DCH-99 to bis-(4-sec-butylaminocyclohexyl)-methane was 50/50, based on equivalents, and the stoichiometry of the epoxy resin to the curatives was 100%. The components were thoroughly mixed for 4 minutes at room temperature using a metal spatula, then poured into a small aluminum weighing pan. The pan was placed in a convection oven at 100° C. for one hour. The turbid mixture became clear upon heating. After setting up, the clear sample was soft at 100° C., but was hard and tack free at room temperature.

Comparison of the Cure Profiles of EXAMPLES 1, 2, and 3

The cure profiles of three samples prepared as in Examples 1, 2, and 3 above were determined using a Scanning Vibrating Needle Curemeter or SVNC (Rapra Technology Ltd., England) and version 2 of the SVNC software. The SVNC uses a carbon fiber vibrating needle to determine the degree of cure of the formulation as a function of time. A detailed description of how the SVNC works can be found in documentation available from the manufacturer.

Prior to mixing, the formulation components were equilibrated at 23° C.+/−1° C. Upon mixing, enough formulation was used to completely fill the stainless steel sample cavity (4 mm deep×12 mm diameter) of the SVNC. The temperature of the cavity was kept constant at 60° C. The carbon fiber needle was submerged to a depth of 3.5 mm and the tip of the needle was 0.5 mm from the bottom of the cavity; whereupon, monitoring was started.

The formulation of Example 2 contained only EPON 848 and DCH-99. At 60° C., the formulation began to thicken after just 3.5 minutes and the polymer set up after about 11 minutes. The shape of the profile curve was very steep. The formulation of Example 1 contained EPON 848 cured with a 75/25 blend of DCH-99 and bis-(4-sec-butylaminocyclohexyl)-methane. This formulation began to thicken after about 10 minutes and set up after about 40 minutes, giving the user more working time. The profile curve was not as steep as the one observed for the formulation of Example 2. The formulation of Example 3 contained EPON 848 cured with a 50/50 blend of DCH-99 and bis-(4-sec-butylaminocyclohexyl)-methane. This formulation began to thicken after over 30 minutes and began to set up after over 2 hours, demonstrating that bis-(4-sec-butylaminocyclohexyl)-methane can be used to easily adjust the working time of the formulation. The cure profile of the formulation of Example 3 was much less steep than the profiles of the formulations of Examples 1 and 2. In the three examples, the best balance between working time and set up time occurred when a 75/25 ratio of DCH-99 and bis-(4-sec-butylaminocyclohexyl)-methane was used.

What is claimed is:

1. An epoxy resin comprising the reaction products of
   (a) a 1,2-epoxy compound;
   (b) a polyol; and
   (c) a curing agent comprising at least one aliphatic secondary diamine of the structure,

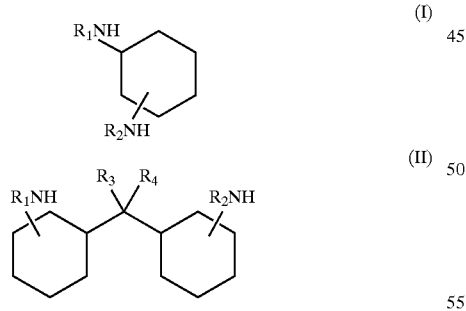

where in structure (I) $R_1$ and $R_2$ are each individually an alkyl, alkenyl, aryl, or arylalkyl group having from about 3 to about 20 carbon atoms, and in structure (II) $R_1$ and $R_2$ are each individually an alkyl, alkenyl, aryl, or arylalkyl group having from about 1 to about 20 carbon atoms and $R_3$ and $R_4$ are each individually an alkyl or alkenyl group having from about 1 to about 20 carbon atoms, or hydrogen.

2. The resin of claim 1 wherein $R_1$ and $R_2$ are branched alkyl groups.

3. The resin of claim 1 wherein $R_1$ and $R_2$ are secondary butyl groups.

4. The resin of claim 1 wherein said 1,2-epoxy compound is epichlorohydrin and said polyol is bis-phenol A.

5. The resin of claim 1 further comprising at least one additional curing agent.

6. A method for preparing a cured epoxy resin comprising reacting an epoxy resin with at least one curing agent comprising an aliphatic secondary diamine of the structure:

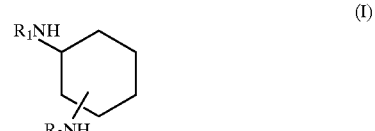

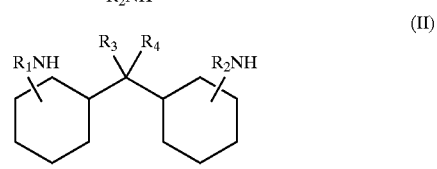

where in structure (I) $R_1$ and $R_2$ are each individually an alkyl, alkenyl, aryl, or arylalkyl group having from about 3 to about 20 carbon atoms, and in structure (II) $R_1$ and $R_2$ are each individually an alkyl, alkenyl, aryl, or arylalkyl group having from about 1 to about 20 carbon atoms and $R_3$ and $R_4$ are each individually an alkyl or alkenyl group having from about 1 to about 20 carbon atoms, or hydrogen.

7. The method of claim 6 wherein $R_1$ and $R_2$ are branched alkyl groups.

8. The method of claim 6 wherein $R_1$ and $R_2$ are secondary butyl groups.

9. The method of claim 6 wherein the reaction is catalyzed by a component selected from the group consisting of an organic acid, an organic base, and a Lewis acid.

10. The method of claim 6 wherein the reaction is conducted at a temperature ranging from about ambient to about 150° C.

11. The method of claim 6 further comprising an additional curing agent.

12. The method of claim 11 wherein the additional curing agent is 1,2-diaminocyclohexane.

13. A method for preparing a cured epoxy resin comprising reacting an epoxy resin with a first curing agent at first temperature and with a second curing agent at a second temperature, said second curing agent comprising an aliphatic secondary diamine of the structure:

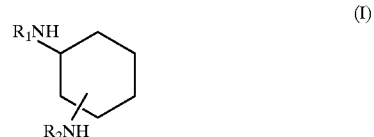

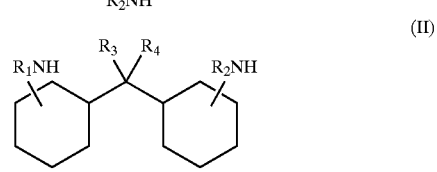

where $R_1$ and $R_2$ are each individually an alkyl, alkenyl, aryl, or arylalkyl group having from about 1 to about 20 carbon atoms, and $R_3$ and $R_4$ are each individually an alkyl or alkenyl group having from about 1 to about 20 carbon atoms, or hydrogen.

14. The method of claim 13 wherein $R_1$ and $R_2$ are branched alkyl groups.

15. The method of claim 13 wherein $R_1$ and $R_2$ are secondary butyl groups.

16. The method of claim 13 wherein the reaction is catalyzed by a component selected from the group consisting of an organic acid, an organic base, and a Lewis acid.

17. The method of claim 13 wherein the second temperature ranges from about ambient to about 150° C.

18. The method of claim 13 wherein the first curing agent is 1,2-diaminocyclohexane.

* * * * *